United States Patent
Kondo

(10) Patent No.: US 11,022,342 B2
(45) Date of Patent: Jun. 1, 2021

(54) HEAT EXCHANGER AND WATER HEATER INCLUDING SAME

(71) Applicant: NORITZ CORPORATION, Hyogo (JP)

(72) Inventor: Masaki Kondo, Kobe (JP)

(73) Assignee: NORITZ CORPORATION, Hyogo (JP)

( * ) Notice: Subject to any disclaimer, the term of this patent is extended or adjusted under 35 U.S.C. 154(b) by 147 days.

(21) Appl. No.: 16/442,101

(22) Filed: Jun. 14, 2019

(65) Prior Publication Data

US 2019/0390874 A1  Dec. 26, 2019

(30) Foreign Application Priority Data

Jun. 26, 2018  (JP) .............................. JP2018-121017

(51) Int. Cl.
*F24H 9/00* (2006.01)
*F24H 1/14* (2006.01)

(52) U.S. Cl.
CPC ............. *F24H 9/0005* (2013.01); *F24H 1/14* (2013.01)

(58) Field of Classification Search
CPC ............ F24H 9/0005; F24H 9/00; F24H 1/14; F23M 5/08; F23M 11/042; F23D 14/36; F23D 14/78; Y02E 20/30; F28F 9/0131; F28F 9/013; F28D 1/0472; F28D 1/047; F22B 37/10
See application file for complete search history.

(56) References Cited

U.S. PATENT DOCUMENTS

| | | | | |
|---|---|---|---|---|
| 3,838,665 A | * | 10/1974 | Astrom | F22B 37/108 122/6 A |
| 3,844,254 A | * | 10/1974 | Astrom | F22B 37/108 122/6 A |
| 4,010,348 A | * | 3/1977 | Salinger | F24C 7/065 392/423 |
| 4,135,575 A | * | 1/1979 | Gersch | F22B 37/102 122/6 A |
| 4,957,160 A | * | 9/1990 | Raleigh | F28F 9/22 165/159 |

(Continued)

FOREIGN PATENT DOCUMENTS

| | | |
|---|---|---|
| JP | 2017-116203 A | 6/2017 |
| KR | 20180007933 A * | 1/2018 |

OTHER PUBLICATIONS

KR 20180007933 A mt (Year: 2018).*

*Primary Examiner* — Gordon A Jones
(74) *Attorney, Agent, or Firm* — Studebaker & Brackett PC

(57) ABSTRACT

A heat exchanger includes a second heat transfer tube disposed in a case on the upstream side of a first heat transfer tube and a plurality of fins in a heating gas flow direction and provided in contact with the inner surface of a side wall portion of the case, and a heat shield member. The heat shield member includes a tube cover portion that covers an outer peripheral surface inside portion of a part of the second heat transfer tube near the plurality of fins, and a first extension portion that extends from the tube cover portion toward the plurality of fins so as to close at least a part of a first gap formed between the second heat transfer tube and the plurality of fins. Thus, a problem whereby the second heat transfer tube corrodes easily can be eliminated, and the thermal efficiency of the heat exchanger can be improved.

9 Claims, 3 Drawing Sheets

(56) References Cited

U.S. PATENT DOCUMENTS

| | | | | |
|---|---|---|---|---|
| 6,267,066 | B1* | 7/2001 | Schickling | F22B 37/108 |
| | | | | 110/324 |
| 7,650,933 | B2* | 1/2010 | Gilbert | F28D 7/1615 |
| | | | | 165/159 |
| 2007/0234939 | A1* | 10/2007 | Mulch | F23M 5/02 |
| | | | | 110/324 |
| 2008/0163792 | A1* | 7/2008 | Seitz | F28F 19/06 |
| | | | | 106/286.3 |
| 2016/0273850 | A1* | 9/2016 | Okamoto | F28F 21/083 |
| 2016/0341498 | A1* | 11/2016 | Lynn | F04D 25/088 |
| 2017/0184349 | A1* | 6/2017 | Ooshita | F28D 7/0075 |
| 2018/0164046 | A1* | 6/2018 | Oohigashi | F28F 1/325 |
| 2018/0372311 | A1* | 12/2018 | Ono | F24H 1/40 |
| 2019/0078776 | A1* | 3/2019 | Ojiro | F24H 9/1845 |
| 2020/0033071 | A1* | 1/2020 | Kondo | F28D 1/0461 |
| 2020/0208875 | A1* | 7/2020 | Jeong | F28D 21/0007 |
| 2020/0306815 | A1* | 10/2020 | Tsuji | B21D 39/20 |

* cited by examiner

HEAT EXCHANGER AND WATER HEATER INCLUDING SAME

BACKGROUND OF THE INVENTION

Field of the Invention

The present invention relates to a heat exchanger of a type that recovers heat from heating gas such as combustion gas, and a water heater such as a hot water supply device that includes the heat exchanger.

Description of the Related Art

Japanese Patent Application Publication No. 2017-116203 describes an example of a water heater.

The water heater described in this document includes a burner and a heat exchanger. The heat exchanger includes a case into which combustion gas generated by the burner is supplied, and first and second heat transfer tubes disposed inside the case, the first heat transfer tube being equipped with a plurality of fins. The second heat transfer tube is positioned inside the case on the upstream side of the first heat transfer tube and the plurality of fins in the flow direction of the combustion gas so as to contact a side wall portion of the case. The second heat transfer tube thus cools the side wall portion of the case, thereby preventing thermal damage to the side wall portion. Water flowing through the second heat transfer tube and the first heat transfer tube is heated by the combustion gas, whereby hot water is generated.

In the above prior art, however, there remains room for improvement, as will be described below.

A burner with strong fire power may be used as the burner, and as a result, the second heat transfer tube may be directly exposed to a flame. In this case, the second heat transfer tube is heated to a very high temperature and is therefore likely to suffer thermal damage. Moreover, when the combustion gas contacts the second heat transfer tube such that the temperature thereof decreases, water vapor in the combustion gas condenses, whereby highly acidic condensed water adheres to an outer surface of the second heat transfer tube. This condensed water is heated by the combustion gas so as to become concentrated on the surface of the second heat transfer tube. Due to this phenomenon, the second heat transfer tube corrodes easily.

Meanwhile, to improve the thermal efficiency of the heat exchanger, it is desirable to maximize the amount of heat absorbed from the combustion gas by the plurality of fins bonded to the first heat transfer tube. For this purpose, it is necessary to prevent large amounts of the combustion gas from passing through gaps between the plurality of fins and the side wall portions of the case. In the prior art described above, however, corresponding measures are not taken. Hence, there remains room for improvement in terms of improving the thermal efficiency.

Note that the amount of heat absorbed by the plurality of fins from the combustion gas can be increased by bonding the plurality of fins to the side wall portions of the case so that no gaps exist therebetween. With this method, however, the plurality of fins are strongly pressed against the side wall portions of the case when the plurality of fins undergo thermal expansion, and as a result, great stress is generated in respective parts.

CITATION LIST

Patent Literature 1: Japanese Patent Application Publication No. 2017-116203

SUMMARY OF THE INVENTION

An object of the present invention is to provide a heat exchanger with which the problems described above can be eliminated appropriately, and a water heater including the heat exchanger.

To solve the problems described above, the present invention employs the following technical means.

A heat exchanger provided by a first aspect of the present invention includes a case into which heating gas is supplied, a first heat transfer tube disposed inside the case, a plurality of heat absorption fins disposed inside the case and bonded to the first heat transfer tube, a second heat transfer tube disposed within the case on an upstream side of the first heat transfer tube and the plurality of fins in a flow direction of the heating gas and provided such that an outer peripheral surface outside portion thereof contacts an inner surface of at least one side wall portion of the case, and a heat shield member having a tube cover portion that covers an outer peripheral surface inside portion of a part of the second heat transfer tube near the plurality of fins, wherein the heat shield member includes a first extension portion that extends from the tube cover portion toward the plurality of fins so as to close at least a part of a first gap formed between the second heat transfer tube and the plurality of fins.

Preferably, the heat exchanger according to the present invention includes, as the second heat transfer tube, a plurality of second heat transfer tubes positioned above the plurality of fins and arranged at intervals in an up-down height direction, and respectively including horizontal straight tube body portions, wherein the tube cover portion covers the outer peripheral surface inside portion of the straight tube body portion of the second heat transfer tube in the lowest position, among the plurality of second heat transfer tubes.

Preferably, the tube cover portion of the heat shield member is brazed to the second heat transfer tube.

Preferably, the heat shield member includes a second extension portion connected to the first extension portion, and the second extension portion extends from a tip end portion of the first extension portion toward the side wall portion so as to be positioned below the second heat transfer tube, a space being formed between the second extension portion and the second heat transfer tube.

Preferably, the second heat transfer tube is brazed to the side wall portion of the case, and the heat shield member includes a third extension portion that is in surface contact with the side wall portion below the second heat transfer tube.

Preferably, the third extension portion is welded to the side wall portion.

Preferably, the case includes, as the side wall portion, a plurality of side wall portions having corner portions that connect the plurality of side wall portions to each other orthogonally, the second heat transfer tube includes straight tube body portions extending respectively along inner surfaces of the plurality of side wall portions and bend portions positioned inside the corner portions, a second gap being formed between the bend portion and an inner surface of the corner portion, and the heat shield member includes a gap cover portion that closes the second gap.

A water heater provided by a second aspect of the present invention includes the heat exchanger provided by the first aspect of the present invention, and a burner that supplies combustion gas into the case of the heat exchanger as the heating gas.

Other features and advantages of the present invention will become more apparent from the embodiment of the invention to be described below with reference to the attached figures.

DETAILED DESCRIPTION OF THE PREFERRED EMBODIMENTS

A preferred embodiment of the present invention will be described specifically below with reference to the figures.

Figure 2A:
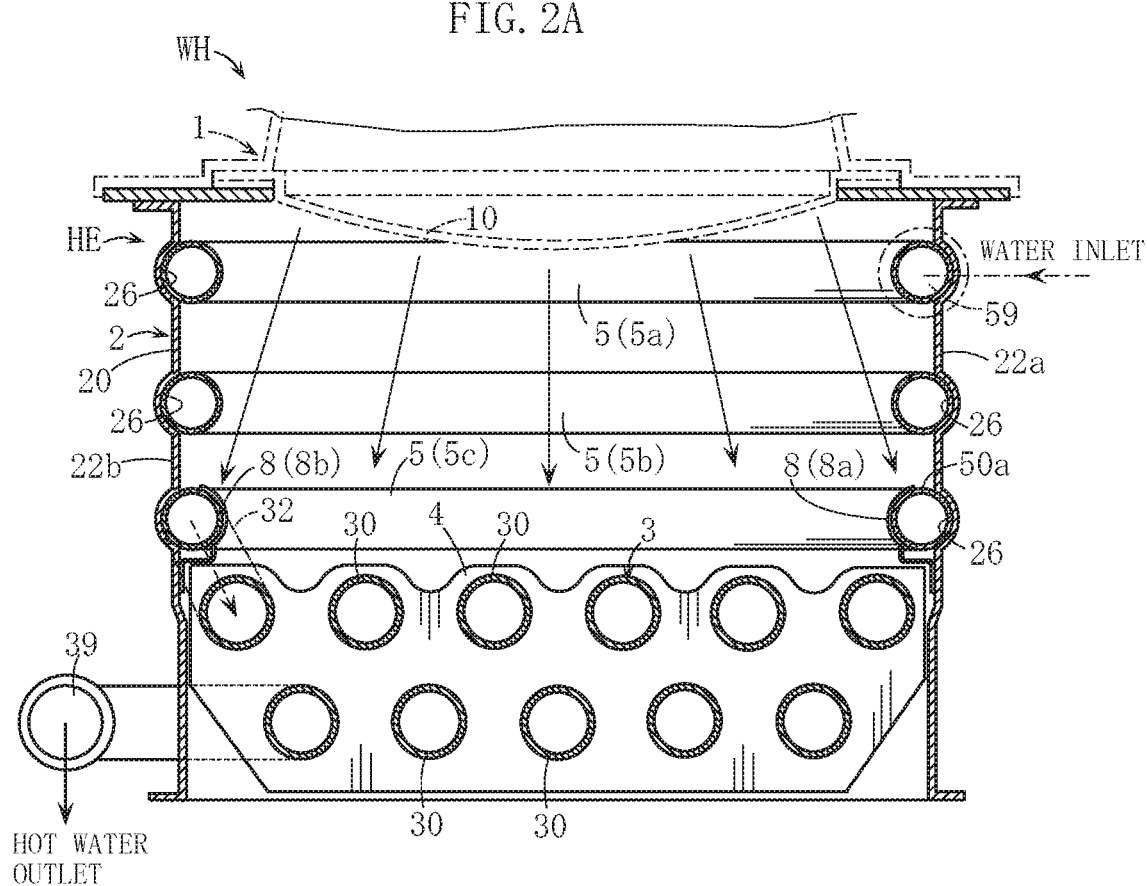
FIG. 2A is a sectional view showing main parts of an example of a water heater combined with the heat exchanger shown in FIG. 1 and a burner.

A water heater WH shown in FIG. 2A includes a heat exchanger HE and a burner 1, a part of which is indicated by virtual lines. An additional heat exchanger (a secondary heat exchanger; not shown) may be further provided below the heat exchanger HE.

A known, conventional burner, such as the burner described in Japanese Patent Application Publication No. 2017-116203, for example, is used as the burner 1. The burner 1 includes an air-permeable gas-air mixture injecting member 10 provided so as to face downward from an upper opening portion of a case 2 of the heat exchanger HE, and a gas-air mixture obtained by mixing fuel gas with combustion air discharged from a fan (not shown) is injected into the case 2 through the gas-air mixture injecting member 10. The gas-air mixture is ignited, whereupon combustion gas is supplied into the case 2 as heating gas.

Figure 1:
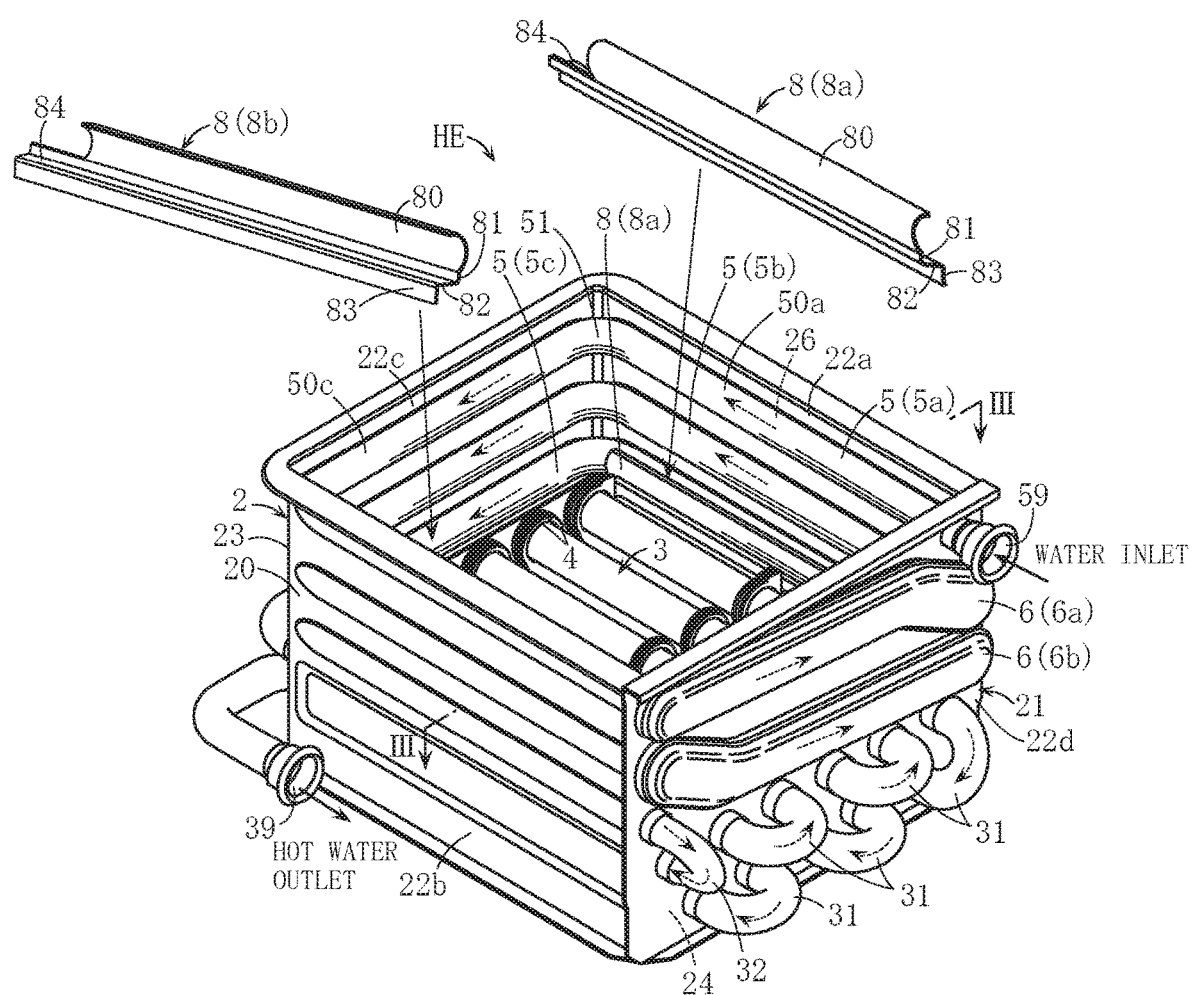
FIG. 1 is a perspective view showing an example of a heat exchanger according to the present invention.

In FIGS. 1 and 2A, the heat exchanger HE includes, in addition to the case 2 mentioned above, a first heat transfer tube 3, a plurality of plate-shaped fins 4, a plurality of second heat transfer tubes 5, and heat shield members 8 (8a, 8b). These parts are all formed from stainless steel, for example, although the specific materials thereof are not limited.

The first heat transfer tube 3 and the plurality of fins 4 are disposed in a region of the case 2 near the lower portion. The first heat transfer tube 3 is formed by connecting a plurality of straight tube body portions 30 in series via substantially U-shaped bend tubes 31 disposed outside the case 2. In the heat exchanger HE, as will be described below, water that is fed into the plurality of second heat transfer tubes 5 through a predetermined water inlet 59 so as to pass through the plurality of second heat transfer tubes 5 is fed into the first heat transfer tube 3 so as to pass through the plurality of straight tube body portions 30 and the bend tubes 31. The plurality of fins 4, which are used to absorb heat, are arranged at appropriate intervals in an axial direction of the straight tube body portions 30 and bonded thereto. In order to increase the amount of heat recovered from the combustion gas by each of the fins 4, respective end portions of each fin 4 are set to be disposed very close to first and second side wall portions 22a, 22b of the case 2 (see FIGS. 2A and 2B).

Figure 3:
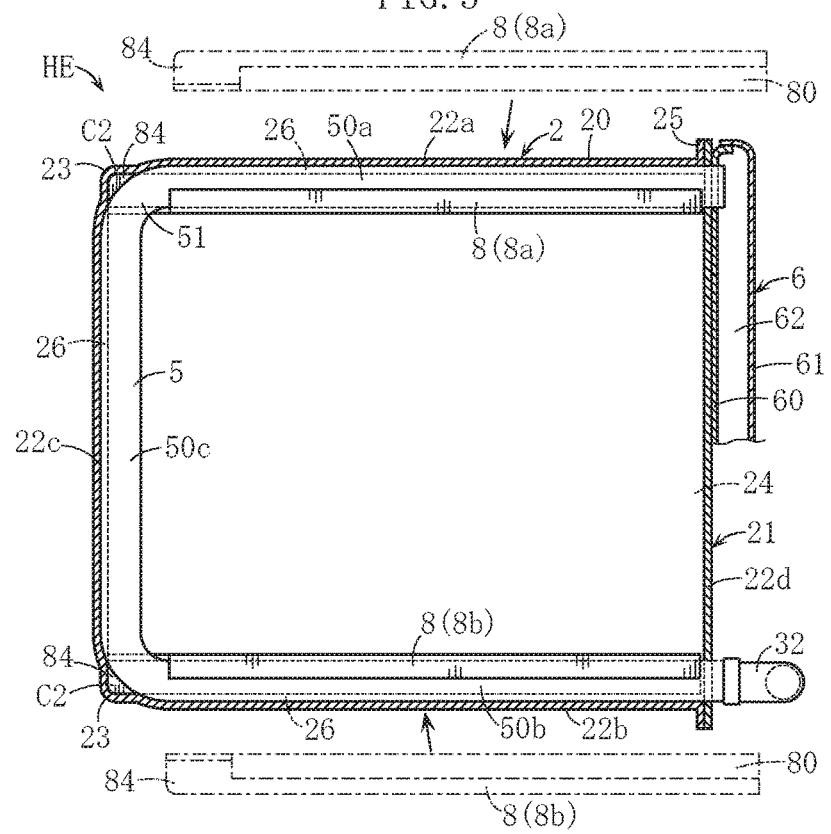
FIG. 3 is an planar sectional view of FIG. 1.

The case 2 substantially takes the form of a rectangular tube with open upper and lower surfaces, and as is evident from FIG. 3, the case 2 is formed by combining a case main body portion 20 with an auxiliary member 21. The case main body portion 20 substantially takes the form of the Greek letter Π in a planar cross-sectional view and is configured such that first to third side wall portions 22a to 22c are connected via corner portions 23 and an opening 24 is formed in one side face. The auxiliary member 21 abuts and is bonded to a flange portion 25 provided on the case main body portion 20, and includes a fourth side wall portion 22d that closes the opening 24 in one side face of the case main body portion 20.

The respective second heat transfer tubes 5 are used to heat water and to cool the first to third side wall portions 22a to 22c of the case 2 so as to prevent thermal damage thereto. Each second heat transfer tube 5 substantially takes the form of the Greek letter Π when seen from above and is configured such that first to third straight tube body portions 50a to 50c are connected via bend portions 51. The fourth side wall portion 22d is cooled by water in header portions 6, to be described below, and is not therefore cooled by the second heat transfer tubes 5. The plurality of second heat transfer tubes 5 are positioned above the plurality of fins 4 and the first heat transfer tube 3 and are provided on a plurality of vertical levels so as to contact the first to third side wall portions 22a to 22c of the case 2. Respective outer peripheral surfaces of the first to third straight tube body portions 50a to 50c are partially fitted into the first to third side wall portions 22a to 22c, and a plurality of groove portions 26 are provided in the first to third side wall portions 22a to 22c in order to form these contact surface areas (heat transfer surface areas) favorably. The first to third straight tube body portions 50a to 50c are respectively brazed to inner surfaces of the groove portions 26.

The auxiliary member 21 includes the plurality of header portions 6 (6a, 6b) through which water flows between the plurality of second heat transfer tubes 5. FIG. 3 shows a partial cross-section of the header portion 6, and as shown in FIG. 3, each header portion 6 is formed by bonding a cover member 61 to a base member 60 bonded to an outer surface of the fourth side wall portion 22d so that a chamber 62 is formed inside the base member 60 and the cover member 61. Respective end portions (end portions on the outsides of the first and second straight tube body portions 50a, 50b) of the plurality of second heat transfer tubes 5 penetrate the fourth side wall portion 22d, whereupon the penetrating end portion either communicates with the chamber 62, is provided with the water inlet 59, or is connected to the first heat transfer tube 3 via a bend tube 32.

A water path through the plurality of second heat transfer tubes 5 is as follows. Water supplied into the water inlet 59 in one end portion of a second heat transfer tube 5a on an uppermost level passes through the second heat transfer tube 5a so as to flow into the upper-level header portion 6a. The water then flows into and through a second heat transfer tube 5b on a second level, then flows into the lower-level header portion 6b, and then flows into a second heat transfer tube 5c on a third level. The water passing through the second heat transfer tube 5c flows into the first heat transfer tube 3 through the bend tube 32 and then reaches a hot water outlet 39. Throughout the process described above, the water is heated by the combustion gas.

The heat shield members 8 are members for protecting the first and second straight tube body portions 50a, 50b of the second heat transfer tube 5 (5c) on the lowermost level, among the plurality of second heat transfer tubes 5. In this embodiment, in accordance with the characteristics of the burner 1, this part of the plurality of second heat transfer tubes 5 is the part most likely to be heated to a high temperature and the part to which highly acidic condensed water is most likely to adhere. Hence, the heat shield member 8 is not provided on other parts. Note, however, that in the present invention, the heat shield member 8 may be provided as appropriate on other parts.

Figure 2B:
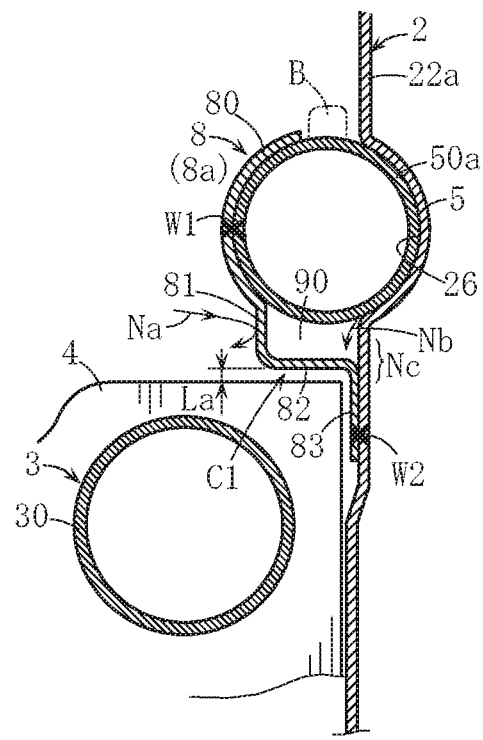
FIG. 2B is a partially enlarged sectional view of FIG. 2A.

As is evident from FIG. 2B, the heat shield member 8 (8*a*) includes a tube cover portion 80 and first to third extension portions 81 to 83. Further, the heat shield member 8 extends in a longitudinal direction of the first straight tube body portion 50*a*, and a gap cover portion 84 is further provided on one end portion thereof (see FIGS. 3 and 4).

The tube cover portion 80 is a part for covering an outer peripheral surface inside portion (a surface near the center of the case 2) of the first straight tube body portion 50*a* of the second heat transfer tube 5, and when seen from the side, the tube cover portion 80 is formed in the shape of an arc that is fitted to the outer peripheral surface inside portion. The tube cover portion 80 is brazed to the first straight tube body portion 50*a*. Note, however, that prior to brazing, the tube cover portion 80 is provisionally bonded to the first straight tube body portion 50*a* via a first welding portion W1 formed by spot welding or the like.

The first extension portion 81 is a part that extends downward from a lower end portion of the tube cover portion 80 toward the plurality of fins 4 so as to close at least a part of a first gap C1 formed between the first straight tube body portion 50*a* and the plurality of fins 4. A gap dimension La between the lower end of the first extension portion 81 and each of the fins 4 is minimized so that either combustion gas advancing from the center side of the case 2, as indicated by an arrow Na, is prevented from passing through the first gap C1, or the passage thereof is suppressed.

The second extension portion 82 is a part that extends substantially horizontally from a tip end portion of the first extension portion 81 toward the first side wall portion 22*a*. The second extension portion 82 is positioned below the first straight tube body portion 50*a* so that a space 90 is formed between the first straight tube body portion 50*a* and the second extension portion 82.

The third extension portion 83 is connected to a tip end portion of the second extension portion 82 and extends downward in surface contact with the inner surface of the first side wall portion 22*a* while avoiding interference with the fins 4. The third extension portion 83 and the first side wall portion 22*a* are bonded via a second welding portion W2 formed by spot welding or the like.

Figure 4:
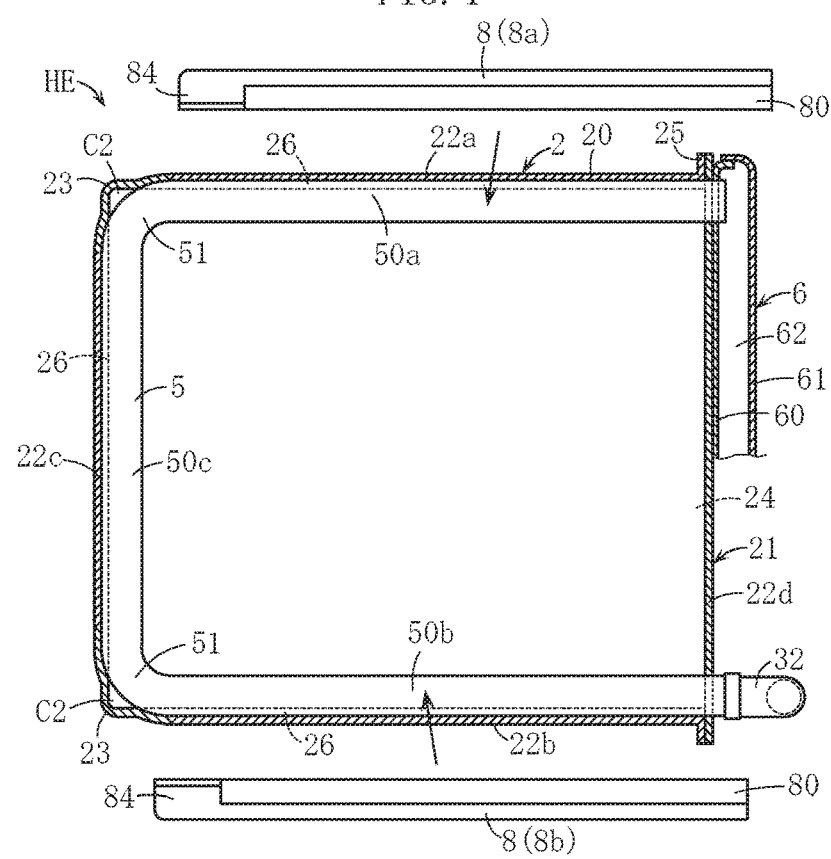
FIG. 4 is an exploded planar sectional view of FIG. 3.

In FIGS. 3 and 4, a second gap C2 is formed between the corner portion 23 of the case 2 and the bend portion 51 of the second heat transfer tube 5. The gap cover portion 84 of the heat shield member 8 is positioned below the second heat transfer tube 5 so as to close the second gap C2.

The other heat shield member 8*b* is used to protect the second straight tube body portion 50*b* and so on. The heat shield member 8*b* is configured similarly to the heat shield member 8*a* described above, and therefore detailed description thereof has been omitted.

Next, actions of the heat exchanger HE and the water heater WH including the heat exchanger HE will be described.

First, since the first and second straight tube body portions 50*a*, 50*b* of the second heat transfer tube 5 (5*c*) on the lowermost level are respectively covered by the tube cover portions 80 of the heat shield members 8, the first and second straight tube body portions 50*a*, 50*b* are not directly exposed to high-temperature combustion gas (including a flame) and are therefore protected from serious thermal damage. Moreover, even in an atmosphere where highly acidic condensed water forms on the surface of the second heat transfer tube 5, this condensed water is prevented from directly adhering to the outer peripheral surface inside portions of the first and second straight tube body portions 50*a*, 50*b*. The surface temperature of the tube cover portion 80 is higher than the surface temperature of the second heat transfer tube 5 itself (the surface of the heat shield member 8 is cooled to a lesser extent by the water), and therefore condensed water is less likely to form on the surface of the heat shield member 8. As a result, the likelihood of corrosion occurring in the parts of the first and second straight tube body portions 50*a*, 50*b* that are covered by the tube cover portions 80 can be reduced.

As described above, the first extension portion 81 of the heat shield member 8 prevents the majority of the combustion gas advancing as shown by the arrow Na from passing through the first gap C1. High-temperature combustion gas is thus prevented from impinging in concentrated fashion on a location of the first side wall portion 22*a* indicated by a reference symbol Nc in FIG. 2B, and as a result, serious thermal damage to this location is also eliminated. Moreover, a favorable effect is obtained in that large amounts of the combustion gas are also prevented from passing through the first gap C1 into the gaps between the fins 4 and the first side wall portion 22*a*. When large amounts of the combustion gas enter the gaps between the fins 4 and the first side wall portion 22*a*, the amount of heat recovered from the combustion gas by the fins 4 and the first heat transfer tube 3 decreases. According to this embodiment, however, this problem can be eliminated appropriately, leading to an improvement in thermal efficiency.

When the second heat transfer tubes 5 are brazed to the first side wall portion 22*a* during manufacture of the heat exchanger HE, as shown in FIG. 2B, a brazing material B is applied to an upper surface portion of the first straight tube body portion 50*a* and then melted by being heated. As a result, a part of the molten brazing material enters the fitted part between the first straight tube body portion 50*a* and the groove portion 26 so that these parts can be brazed appropriately. Note that at this time, excess molten brazing material flowing into the fitted part may travel along the inner surface of the first side wall portion 22*a*, as indicated by an arrow Nb, so as to flow further downward from the first straight tube body portion 50*a*. In this case, the molten brazing material reaches the part where the first side wall portion 22*a* and the third extension portion 83 are in surface contact. Hence, the molten brazing material is halted in this surface contact part and appropriately prevented from flowing even further downward. When, in contrast to this embodiment, molten brazing material flows into the gaps between the fins 4 and the first side wall portion 22*a* so that these components are bonded thereby, unnecessary stress is generated in the respective parts in response to thermal expansion of the fins 4, but according to this embodiment, this phenomenon can be prevented appropriately. The first side wall portion 22*a* and the third extension portion 83 are provisionally bonded in advance via the second welding portion W2, thereby ensuring that a gap is not formed between the first side wall portion 22*a* and the third extension portion 83, and as a result, molten brazing material can be prevented from flowing further downward even more reliably.

The heat shield member 8 is brazed to the first straight tube body portion 50*a* when molten brazing material constituting a part of the aforementioned brazing material B enters a region between the tube cover portion 80 of the heat shield member 8 and the first straight tube body portion 50*a*. In this case, the molten brazing material may flow out of the region between these components and flow downward along the first extension portion 81. In this embodiment, however, the molten brazing material reaches the upper surface portion of the second extension portion 82 and accumulates in the space 90. Therefore, a problem in which the molten brazing material runs down below the heat shield member 8 and adheres to the fins 4 can be prevented from occurring.

As shown in FIGS. 3 and 4, the gap cover portion 84 of the heat shield member 8 closes the second gap C2 formed on the inside of the corner portion 23 of the case 2. As a result, the amount of combustion gas passing wastefully through the second gap C2 can be reduced, leading to an improvement in thermal efficiency. Since the heat shield member 8 is used effectively as means for closing the second gap C2, the number of components can be reduced, and therefore employing the heat shield member 8 in this fashion is reasonable.

The series of actions described above are obtained similarly with the heat shield member 8 (8*b*) provided on the second straight tube body portion 50*b* side.

The present invention is not limited to the content of the embodiment described above, and the specific configurations of the respective parts of the heat exchanger and water heater according to the present invention may be freely subjected to various design modifications within the intended scope of the present invention.

In the above embodiment, the heat shield member is provided only on a part of the second heat transfer tube on the lowermost level, among the second heat transfer tubes provided on a plurality of vertical levels, but the heat shield member may also be provided on another part of the second heat transfer tube on the lowermost level and also on second heat transfer tubes other than the second heat transfer tube on the lowermost level.

As long as the heat shield member includes the tube cover portion covering the outer peripheral surface inside portion of at least the part of the second heat transfer tube near the plurality of fins and the first extension portion closing at least a part of the first gap formed between the second heat transfer tube and the plurality of fins, the heat shield member according to the present invention may be configured without the second and third extension portions. Moreover, the heat shield member is preferably brazed to the second heat transfer tube but may be bonded to the second heat transfer tube by welding alone, for example.

There are also no limitations on the specific shapes and so on of the case and the second heat transfer tubes. The second heat transfer tube may be constituted by a serpentine tube having a substantially rectangular shape when seen from above, for example.

There are likewise no limitations on the specific material used as the brazing material and so on.

In the above embodiment, a so-called reverse combustion system in which the burner is disposed on the upper side of the heat exchanger is employed, but the present invention is not limited thereto, and a so-called normal combustion system in which the burner is disposed on the lower side of the heat exchanger, for example, may be employed instead. The heating gas is not limited to combustion gas, and high-temperature exhaust gas generated in a cogeneration system or the like, for example, may be used instead.

The water heater according to the present invention has a function for generating hot water by heating water, and in addition to a general water heater, the water heater includes a bath hot water supply device, an air-heating water heater, a snow-melting water heater, and so on, for example.

The invention claimed is:

1. A heat exchanger, comprising:
   a case into which heating gas is supplied, the case comprising at least three side wall portions directly connected to each other;
   a first heat transfer tube disposed inside the case;
   a plurality of heat absorption fins disposed inside the case and bonded to the first heat transfer tube;
   a second heat transfer tube disposed within the case and extending along at least one of the side wall portions of the case on an upstream side of the first heat transfer tube and the plurality of fins in a flow direction of the heating gas and provided such that an outer peripheral surface outside portion thereof contacts an inner surface of the at least one of the side wall portions of the case; and
   a heat shield member having a tube cover portion that covers an outer peripheral surface inside portion of a part of the second heat transfer tube near the plurality of fins,
   wherein the heat shield member includes a first extension portion that extends from the tube cover portion toward the plurality of fins so as to close at least a part of a first gap formed between the second heat transfer tube and the plurality of fins; and
   wherein the heat shield member is attached in direct contact with the outer peripheral surface inside portion of the second heat transfer tube.

2. The heat exchanger according to claim 1, comprising, as the second heat transfer tube, a plurality of second heat transfer tubes positioned above the plurality of fins and arranged at intervals in an up-down height direction, and respectively including horizontal straight tube body portions,
   wherein the tube cover portion covers the outer peripheral surface inside portion of the straight tube body portion of the second heat transfer tube in the lowest position, among the plurality of second heat transfer tubes.

3. The heat exchanger according to claim 1, wherein the tube cover portion of the heat shield member is brazed to the second heat transfer tube.

4. The heat exchanger according to claim 3, wherein the heat shield member includes a second extension portion connected to the first extension portion, and the second extension portion extends from a tip end portion of the first extension portion toward the side wall portion so as to be positioned below the second heat transfer tube, a space being formed between the second extension portion and the second heat transfer tube.

5. The heat exchanger according to claim 4, wherein the second heat transfer tube is brazed to the side wall portion of the case, and the heat shield member includes a third extension portion that is in surface contact with the side wall portion below the second heat transfer tube.

6. The heat exchanger according to claim 1, wherein the second heat transfer tube is brazed to the side wall portion of the case, and the heat shield member includes a third extension portion that is in surface contact with the side wall portion below the second heat transfer tube.

7. The heat exchanger according to claim 6, wherein the third extension portion is welded to the side wall portion.

8. The heat exchanger according to claim 1, wherein
the case includes, as the side wall portion, a plurality of side wall portions having corner portions that connect the plurality of side wall portions to each other orthogonally,
the second heat transfer tube includes straight tube body portions extending respectively along inner surfaces of the plurality of side wall portions and bend portions positioned inside the corner portions, a second gap being formed between the bend portion and an inner surface of the corner portion, and
the heat shield member includes a gap cover portion that closes the second gap.

9. A water heater comprising:
the heat exchanger according to claim 1; and
a burner that supplies combustion gas into the case of the heat exchanger as the heating gas.

\* \* \* \* \*